Figure 1:
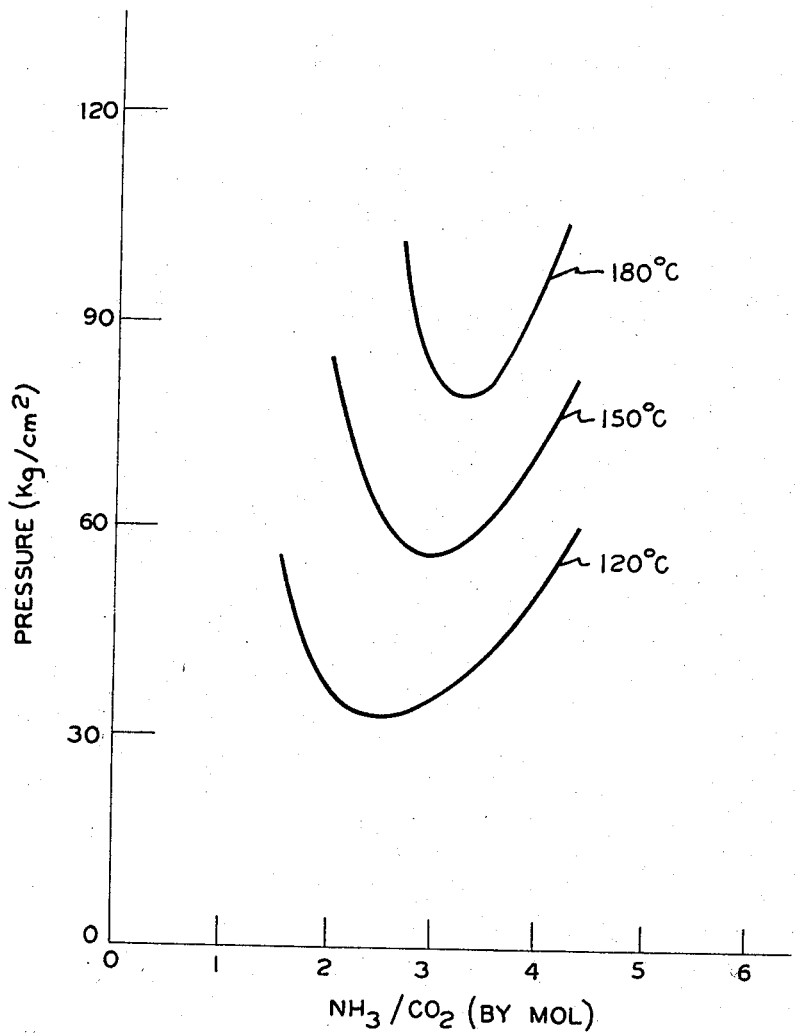

3,372,189
PROCESS FOR SYNTHESIZING UREA
Eiji Otsuka and Kazumichi Kanai, Fujisawa, and Sadashi Chikaoka, Yokohama, Japan, assignors to Toyo Koatsu Industries, Incorporated, Tokyo, Japan, a corporation of Japan
Filed May 24, 1965, Ser. No. 457,914
Claims priority, application Japan, May 26, 1964, 39/29,335
5 Claims. (Cl. 260—555)

This invention relates to a process of synthesizing urea in a conventional process of synthesizing ammonia from a raw material gas containing $N_2$, $H_2$ and $CO_2$. More particularly the invention relates to an improvement in synthesizing urea in a conventional process of synthesizing ammoia from a raw material gas containing $N_2$, $H_2$ and $CO_2$.

Urea is conventionally synthesized at a high temperature and pressure by reacting liquid ammonia with liquid carbon dioxide. Liquid ammonia is synthesized usually from hydrogen obtained by purifying an ammonia synthesizing raw material gas produced from a carbonaceous raw material or a mixture of a hydrocarbon and nitrogen. Liquid carbon dioxide is obtained by washing the ammonia synthesizing raw material gas and adsorbing carbon dioxide contained therein with water, an aqueous ammonia solution, an aqueous solution of a caustic alkali or ethanolamine under pressure, discharging the absorbed carbon dioxide by decreasing the pressure of the resulting absorbate or heating the resulting absorbate, and compressing and liquefying the discharged carbon dioxide. Thus, the series of steps from the preparation of the raw material gas for synthesizing ammonia to the synthesis of urea were complicated and the cost of manufacturing urea has been high.

It is therefore an object of this invention to provide a novel, simple, inexpensive process for the manufacture of urea.

Another object of this invention is the provision of a novel process for manufacturing urea employing fewer steps than heretofore employed.

Another object of this invention is the provision of a novel process of synthesizing urea which can be used in a conventional process for synthesizing ammonia.

Another object of this invention is to provide an improvement in a process of synthesizing urea utilizing a conventional process for synthesizing ammonia.

The present invention resides in a method of synthesizing urea comprising the steps of washing an ammonia synthesizing raw material gas containing carbon dioxide with an aqueous absorbent solution containing ammonia and carbon dioxide at a pressure of at least 150 kg./cm.² to absorb substantially all of the carbon dioxide contained in said raw material gas to form an absorbate, the mol ratio of ammonia to carbon dioxide in the absorbent being adjusted so that the mol ratio of ammonia to carbon dioxide in the resulting absorbate is 2 to 3.6, the temperature of the absorbent being less than 100° C., and maintaining the absorbate at a urea synthesizing temperature to form urea.

In washing the raw material gas containing carbon dioxide with the absorbent solution, it is preferable that the amount of ammonia in the gas withdrawn from the top of the scrubbing column be as small as possible whereas carbon dioxide must not be contained in the gas withdrawn from the top of the scrubbing column. Therefore, in order to satisfy both of these conditions, it is important to properly select the composition of the aqueous absorbent solution and the temperature before feeding the aqueous absorbent solution to the scrubbing column.

In the bottom of the scrubbing column to which the ammonia synthesizing raw material gas is fed, the temperature of the absorbate should be as high as possible in order to reduce the amount of heat required to be fed to the urea synthesizing step. It is preferable that the amounts of $NH_3$ and $CO_2$ carried by the gas from the bottom to the top of the column be as small as possible. It is therefore necessary to select such composition of the absorbate as will minimize the partial pressure of $NH_3$ and $CO_2$ on the absorbate in the bottom of the column.

FIG. 1 shows total equilibrium pressures versus mol ratios of $NH_3$ to $CO_2$ in four-component systems of $NH_3$—$CO_2$—$H_2O$—urea containing 5% urea and 20% water. The partial pressure of ammonia reduces substantially linearly with the decrease of the mol ratio of $NH_3/CO_2$ in the liquid. On the other hand, the partial pressure of carbon dioxide increases as a quadratic curve with the decrease of the mol ratio of $NH_3/CO_2$. Generally, at a comparatively low temperature, the total partial pressure of the system becomes minimum at a mol ratio of $NH_3/CO_2$ of about 2. This minimum pressure point moves toward a larger mol ratio of $NH_3/CO_2$ with the increase of the temperature.

The relation between the temperature and the mol ratio of $NH_3/CO_2$ at the minimum pressure point in the four-component system of $NH_3$—$CO_2$—$H_2O$—urea containing 5% urea and 20% water is shown in Table 1.

TABLE 1

| Temperature in ° C. | Liquid composition | | |
|---|---|---|---|
| | $NH_3$ in percent by weight | $CO_2$ in percent by weight | Mol ratio of $NH_3/CO_2$ |
| 120 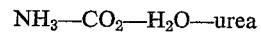 | 35 | 40 | 2.3 |
| 150 | 40 | 35 | 2.9 |
| 180  | 42 | 33 | 3.3 |

FIGURE 1 and Table 1 show values of the mol ratio of $NH_3/CO_2$ at the point of the minimum equilibrium pressure in the four-component system of $$NH_3—CO_2—H_2O—\text{urea}$$

containing 5% urea and 20% water. If the content of urea and water is in the range of 20 to 40% based on the total weight af absorbate and if the content of water is in the range of 15 to 40% based on the total weight of absorbate in a three-component system of $$NH_3—CO_2—H_2O$$

the equilibrium pressure increases or decreases but values of the mol ratio of $NH_3/CO_2$ at the point of the minimum equilibrium pressure does not substantially vary. Therefore, it is necessary that the composition of the absorbate in the column bottom be in the range of 2 to 3.6 mol ratio of $NH_3/CO_2$. If there is more ammonia in this composition, much ammonia is discharged out of the column top, and if there is more carbon dioxide in this composition, carbon dioxide is likely to pass out of the column top into the raw material gas going to the ammonia synthesis reactor.

It is practical to use for the aqueous absorbent solution containing ammonia and carbon dioxide a solution, hereinafter referred to as the recovered solution, prepared by distilling unreacted ammonia and carbon dioxide contained in a urea synthesis effluent and absorbing the distilled ammonia and carbon dioxide with water or aqueous urea solution. The composition of this recovered solution may be adjusted, if necessary, by adding ammonia so that the composition in the column bottom is maintained in the above-described range. Theoretically, the addition of ammonia to the recovered solution can be made at any point in the scrubbing column. However, as a practical matter, if it is added at the column top, the partial pressure of ammonia at the column top becomes higher than is required. Therefore, it is proper to add it at a point near the point of feeding the ammonia synthesizing raw material gas adjacent the column bottom. The composition of the recovered solution can vary depending on the proportion of excess ammonia utilized in synthesizing urea, for example, as shown in Table 2.

TABLE 2

|  | In case the excess $NH_3$ is 80% | In case the excess $NH_3$ is 150% |
|---|---|---|
| $NH_3$ | 35 to 40% | 40 to 45%. |
| $CO_2$ | 25 to 30% | 25 to 30%. |
| $NH_3/CO_2$ (mol ratio) | 3.3 to 3.5 | 3.8 to 4.1. |
| $H_2O$ (+urea*) | 30 to 40% | 25 to 35%. |

*Optional.

As described above, the composition of the absorbate in the bottom of the scrubbing column is of a mol ratio of $NH_3/CO_2$ of 2 to 3.6. When the urea synthesis is carried out on an absorbate having a mol ratio of ammonia to carbon dioxide in this range, urea can be synthesized by maintaining the absorbate from the column bottom at about 180 to 200° C. However, if it is desired to carry out the urea synthesis on a composition having a mol ratio of $NH_3/CO_2$ more than the above-described range, it is preferable to add the excess ammonia to the absorbate in the urea synthesis reactor. In such case, as the temperature of the absorbate from the coludn bottom is usually about 120 to 180° C., the temperature of the absorbate from the scrubbing column can be elevated to the urea synthesizing temperature simply by preheating the excess ammonia fed into the urea synthesis reactor. The preheating of ammonia can be carried out without corrosion and, because the specific heat of ammonia at high temperatures is so large, the preheating temperature is sufficient at about 150 to 250° C.

Figure 2:
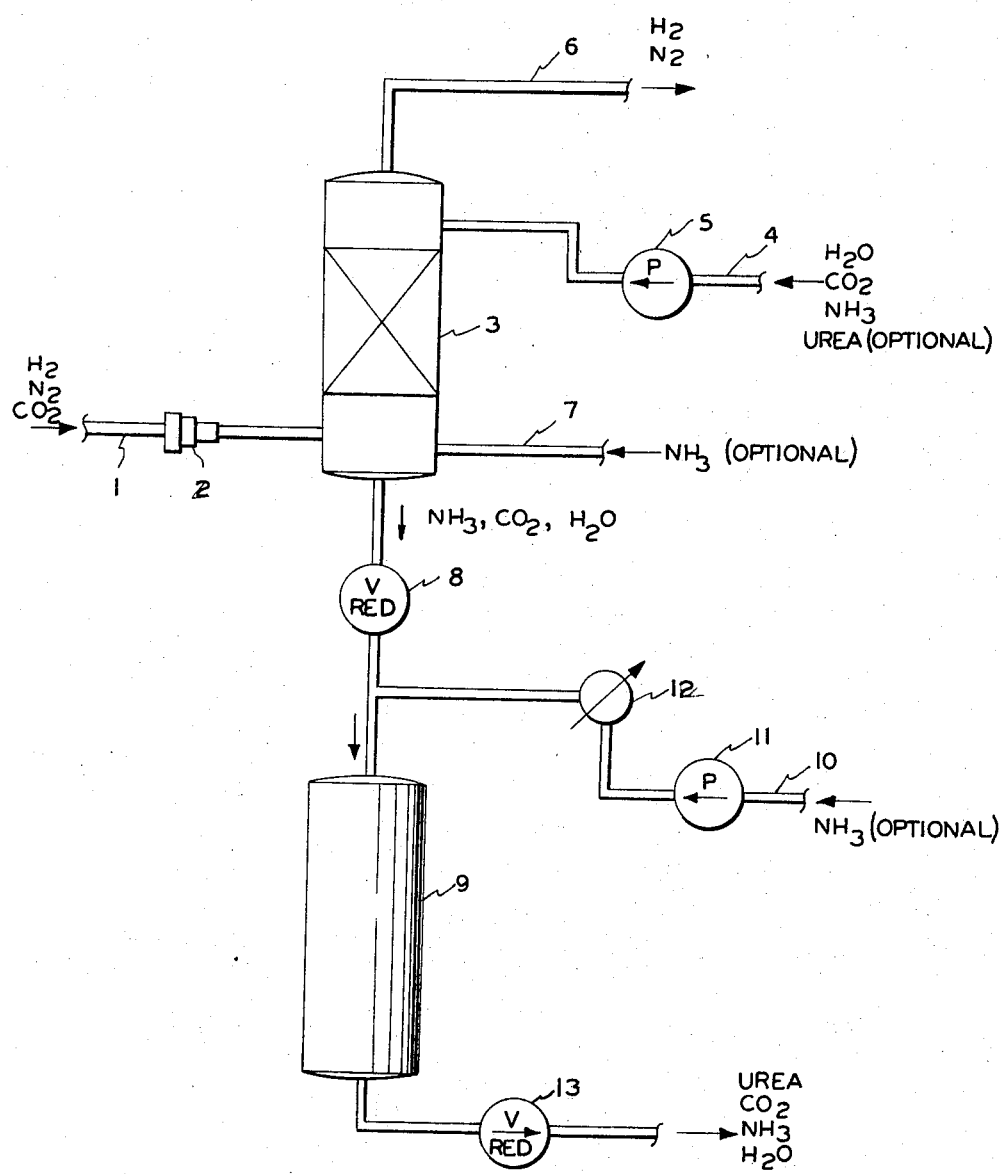

The process of the present invention shall now be explained with reference to FIG. 2 which shows diagrammatically the apparatus used in the method of this invention. An ammonia synthesizing raw material gas containing hydrogen, nitrogen and carbon dioxide fed through pipe 1 is compressed by a compressor 2 to a pressure of at least 150 kg./cm.², preferably above 250 kg./cm², and is fed into the bottom part of a scrubbing column 3. An aqueous absorbent solution, comprising a recovered solution obtained by absorbing unreacted ammonia and carbon dioxide distilled from a urea synthesis effluent with water or an aqueous urea solution and at a pressure of 10 to 30 kg./cm.², is introduced into a plunger pump 5 through a pipe 4, is compressed to the above-mentioned pressure and is introduced into the top of the scrubbing column to absorb the carbon dioxide contained in the ammonia synthesizing raw material gas. The temperature of the aqueous absorbent solution before introduction into the scrubbing column is lowered below about 100° C. The ammonia synthesizing raw material gas free of carbon dioxide is taken out of the top of the scrubbing column through a pipe 6, is further purified and then is fed to an ammonia synthesis reactor.

Gaseous or liquid ammonia is fed into the bottom of the column through a pipe 7 and the mol ratio of $NH_3/CO_2$ of the absorbate in the column bottom is thus adjusted to 2 to 3.6. The ammonia thus aded to adjust the mol ratio of $NH_3/CO_2$ of the absorbent solution can be added at any point of the scrubbing column or can be aded to the absorbent solution before it is fed into the scrubbing column 3 through pipe 4. The resulting absorbate, which has absorbed the carbon dioxide contained in the incoming ammonia synthesizing raw material gas, is decompressed, if necessary, to a urea synthesizing pressure by means of a reducing valve 8 and is fed to a urea synthesis reactor 9. To the absorbate to be introduced into the urea synthesis reactor there is added, if necessary, through a pipe 10, ammonia which has been compressed to the urea synthesizing pressure with a plunger pump 11 and preheated with a preheater 12. The absorbate introduced into the urea synthesis reactor 9 is maintained at a urea synthesizing temperature of about 160 to 200° C. The resulting urea synthesis effluent is removed from reactor 9, is decompressed to a proper pressure with a reducing valve 13 and thereafter is separated into an aqueous urea solution and a mixture of unreacted ammonia and carbon dioxide by any suitable distillation method. The unreacted ammonia and carbon dioxide distilled off are absorbed in suitable amounts with water or an aqueous urea solution to form a recovered solution which can be recycled to the scrubbing column 3.

The incoming raw material gas through pipe 1 and gas compressor 2 usually is at a temperature of 30 to 200° C. The pressure in the chamber 3 can be varied from 150, preferably 250, kg./cm.² to 600 kg./cm.² and the pressure in the reactor 9 can be varied from 150 to 300 kg./cm.². The temperature of the recovered solution entering chamber 3 through pipe 4 can be 60 to 100° C. and the temperature of ammonia entering through pipe 7 can be varied from 0 to 150° C. The temperature of ammonia, if any, added through pipe 10 to the absorbate passing into reactor 9 can be varied from 60 to 250° C. and the temperature of absorbate, with or without added ammonia, entering reactor 9 can be varied from 160 to 200° C.

Examples of the present invention are presented wherein the percentages for the raw material gases are based on volume.

*Example 1*

334.5 m.³/hr. (at standard temperature and pressure) of an ammonia synthesizing raw material gas consisting of 72.0% $H_2$, 24.2% $CO_2$, 3.6% CO, 0.1% $N_2$ and 0.1% $CH_4$ from a carbon monoxide converting furnace of an ammonia synthesis plant were compressed to 320 kg./cm.² with a gas compressor 2 and were introduced through pipe 1 into the bottom part of a scrubbing column 3 of a urea synthesis plant having a daily production of 5 tons of urea.

A recovered solution containing 35 kg./hr. of urea, 150 kg./hr. of $NH_3$, 125 kg./hr. of $CO_2$ and 115 kg./hr. of $H_2O$ was fed as an aqueous absorbent solution to the top part of the scrubbing column through pipe 4. Further, 125 kg./hr. of liquid ammonia were fed to the column bottom through pipe 7 and the composition of the absorbate in the column bottom was maintained at a mol ratio of $NH_3/CO_2$ of about 2.5. When the column top temperature was kept at 45° C., the column bottom temperature was 150 to 155° C. and all of the 158 kg./hr. of $CO_2$ contained in the raw material gas was absorbed in the absorbent solution. The raw material gas taken from the top of the scrubbing column through pipe 6 contained 0.6 kg./hr. of $NH_3$ and 0.1 kg./hr. of $H_2O$ in addition to $H_2$, CO, $N_2$ and $CH_4$ and was returned to the ammonia synthesis plant.

The absorbate withdrawn from the bottom part of the scrubbing column was then introduced into a urea synthesis reactor 9 through a reducing valve 8. 232 kg./hr. of liquid ammonia from an ammonia collector in the ammonia synthesis plant were compressed, preheated to 155° C. and introduced into the urea synthesis reactor through pipe 10.

The urea synthesis reactor was kept at a temperature of about 190° C. and at a pressure of about 260 kg./cm.². The urea synthesis effluent from the urea synthesis reactor had a composition of 255.2 kg./hr. of urea, 381.5 kg./hr. of $NH_3$, 121.5 kg./hr. of $CO_2$ and 181.1 kg./hr. of $H_2O$ and was passed through valve 13 to distillation apparatus where the $CO_2$ and $NH_3$ contained thereby were removed. The resulting urea solution was treated for recovery of urea and the removed $CO_2$ and $NH_3$ were absorbed in proper amounts in an aqueous urea solution to form the above-described recovered solution which was then recycled to pipe 4.

*Example 2*

339 m.³/hr. (at standard temperature and pressure) of an ammonia synthesizing raw material gas, consisting of 72.0% $H_2$, 24.2% $CO_2$, 3.6% CO, 0.1% $N_2$ and 0.1%

$CH_4$ from a carbon monoxide converting furnace of an ammonia synthesis plant, were compressed to 340 kg./cm.$^2$ with a gas compressor 2 and were introduced into the bottom part of a scrubbing column 3 of a urea synthesis plant having a daily production of 5 tons of urea.

A recovered solution consisting of 71 kg./hr. of $NH_3$, 61 kg./hr. of $CO_2$ and 105 kg./hr. of $H_2O$ was fed as an aqueous absorbent solution through pipe 4 to the top part of the scrubbing column. 169 kg./hr. of liquid ammonia were fed through pipe 7 to the bottom part of the column and the composition of the absorbate in the column bottom was kept at a mol ratio of $NH_2/CO_3$ of 2.8. When the column top temperature was kept at 45° C., the column bottom temperature became 155 to 160° C. and all of 160 kg./hr. of $CO_2$ in the raw material gas was absorbed in the absorbent solution. The gas from the top part of the scrubbing column was returned to the ammonia synthesis plant. It contained 0.5 kg./hr. of $NH_3$ and 0.2 kg./hr. of $H_2O$ in addition to $H_2$, CO, $N_2$ and $CH_4$.

The absorbate withdrawn from the bottom part of the scrubbing column was decompressed to 280 kg./cm.$^2$ through a reducing valve 8 and was then introduced into a urea synthesis reactor 9. 225 kg./hr. of liquid ammonia from an ammonia collector in the ammonia synthesis plant were compressed, preheated to 155° C. and introduced into the urea synthesis reactor. The urea synthesis reactor was kept at a temperature of about 190° C. and a pressure of about 280 kg./cm.$^2$. The composition of the urea synthesis effluent from the urea synthesis reactor was 219.1 kg./hr. of urea, 340.3 kg./hr. of $NH_3$, 60.3 kg./hr. of $CO_2$ and 170.6 kg./hr. of $H_2O$. This effluent was passed to distillation apparatus where the $CO_2$ and $NH_3$ were distilled off leaving an aqueous urea solution which was then treated to recover urea. The $CO_2$ and $NH_3$ driven off were absorbed in suitable amounts in a suitable amount of water to form the above-described recovered solution which was recycled to the scrubbing column 3.

The composition of the absorbent introduced through pipe 4 can vary over a wide range and is adjusted to provide an absorbate at the bottom of column 3 having 2.0 to 3.6 mols of ammonia per mole of carbon dioxide. Thus, the specific composition of the absorbent will depend upon the amount of carbon dioxide in the raw material gas, whether or not ammonia is added through pipe 7 and to some extent on the temperatures existing in the column 3. In practice, however, the mol ratio of ammonia to carbon dioxide in the absorbent can be varied over a range of 2 to 10, the amount of water can be varied from 15 to 40% and the amount of urea can be varied from 0 to 20%, said percentages being based on the total weight of the absorbent. These ranges and those set forth hereinabove just prior to the examples are representative since, by varying other conditions in accordance with the above teachings, one skilled in the art would be able to arrive at values outside said ranges.

What is claimed is:
1. Method of eliminating carbon dioxide from an ammonia synthesizing raw material gas containing hydrogen, nitrogen and carbon dioxide and utilizing said eliminated carbon dioxide in the manufacture of urea, comprising the steps of introducing said gas into the lower portion of a washing zone maintained at a pressure of at least about 150 kg./cm.$^2$ and passing said gas upwardly through said zone, introducing an absorbent comprising an aqueous solution containing carbon dioxide and ammonia at a temperature less than about 100° C. into the upper portions of said zone and passing it downwardly through said zone in countercurrent contact with said gas to absorb the carbon dioxide in said gas and form an absorbate, collecting said absorbate in the lower portions of said zone, maintaining the composition of said absorbate collected in said lower portions at 2.0 to 3.6 mols ammonia per mol of carbon dioxide by feeding ammonia into the lower portion of said zone while maintaining the temperature of said absorbate at 120 to 180° C., removing said gas freed of carbon dioxide from the upper portions of said zone and passing it to an ammonia synthesis reactor, and removing said absorbate from the lower portions of said zone, adjusting the pressure and temperature thereof to a presure and temperature suitable for urea synthesis and thereafter passing same to a urea synthesis reactor to form an aqueous solution of urea, unreacted carbon dioxide and unreacted ammonia.

2. Method claimed in claim 1 wherein said absorbent contains from 15 to 40% water based on the total weight of said absorbent.

3. Method claimed in claim 2 wherein said absorbent contains minor amounts of urea.

4. Method claimed in claim 1 wherein heated ammonia is added to said removed absorbate to adjust its temperature to one suitable for urea synthesis.

5. Method claimed in claim 1 wherein said solution of urea, unreacted carbon dioxide and unreacted ammonia is subjected to distillation to remove carbon dioxide and ammonia and a fresh absorbent is formed from the removed carbon dioxide and ammonia and is fed to the upper portions of said zone.

References Cited
UNITED STATES PATENTS 3,303,215  2/1967  Otsuka et al. _____ 260—555

FOREIGN PATENTS 981,265  1/1965  Great Britain.
948,786  2/1964  Great Britain.

HENRY R. JILES, *Primary Examiner.*